United States Patent Office
3,502,945
Patented Mar. 24, 1970

3,502,945
SWITCHING CONTROL APPARATUS
Bernard Albert Bentley, Camberley, and Fredric Charles Lamb, London, England, assignors to Essoldomatic Limited, London, England
Filed Aug. 17, 1967, Ser. No. 661,352
Int. Cl. H01r 29/00
U.S. Cl. 317—139                            14 Claims

ABSTRACT OF THE DISCLOSURE

This invention provides a switching control apparatus for the operation, preferably in a predetermined sequence, of selected relays and for the selective de-energization of these relays in an independent predetermined sequence. Selection of relays to be energized is effected by the insertion of first diode plugs into a matrix to interconnect selected conductors of first and second conductor groups of the matrix to provide an energization circuit for the selected relay. De-energization of the selected relays is also effected through the matrix by way of further diode plugs interconnecting selected conductors of the first and a third group of matrix conductors. Successive conductors of the first group may be supplied with current sequentially.

---

This invention relates to switching control apparatus, and more particularly to apparatus for controlling different switching functions of electrical control circuits.

It is frequently desirable to arrange for the actuation of different switching functions automatically and in a predetermined sequence. For example, in hotels it is necessary to control a large number of different services, for example, heating, ventilating, alarms, and lighting in a regular sequence throughout a day. A similar necessity arises in the control of circuits for lighting, cue alarms and film projectors in a cinema.

The commonest known arrangement for automatic sequential control of switching functions employs cam-operated switches, each connected to a respective relay device, which are operated by respective cams mounted on a common rotary shaft. By suitably arranging the cams on the shaft the switches can be operated in any desired sequence on rotation of the shaft. Such an arrangement suffers from two disadvantages. In the first place it is difficult to arrange for accurate operation of the cam switches at required times, since the precise time of operation of the switches is very sensitive to the setting and shape of the cams. In the second place, and probably more importantly, such arrangements cannot easily be adjusted: in order to change the time of operation of a given cam operated switch it is necessary to change the setting of the respective cam on the rotary shaft.

It is an object of the present invention to provide a switching control apparatus which is both precise in operation and capable of adjustment without difficulty. A further object is to provide a control apparatus in which control circuits may be energized in a pre-settable sequence, the sequence being readily ascertainable.

According to the present invention, in a broad aspect thereof there is provided a switching control apparatus comprising a matrix of first and second groups of conductors arranged so that each conductor of the first group crosses but does not contact each conductor of the second group; respective connector means for connecting as required any selected conductor of the first group to any selected conductor of the second group; respective input lines connected to respective conductors of the first group, and respective output lines connected to respective conductors of the second group, whereby an electrical circuit including any selected conductor of the first group and its respective input line is completed through such conductor of the second group and its respective output lines as is selectively connected by said connector means to said selected conductor of the first group.

The selective switching means are preferably operative to make an electrical connection to each said input line in a predetermined sequence. The connector means may be adjusted without difficulty so as to change the sequence of energisation of any of the control circuits relative to the other control circuits. In one embodiment, for example, the connector means comprise, respective connector plugs and the first and second groups of conductors are carried by an insulating member having respective sockets therein, corresponding to each crossing point of the conductors, for the removable insertion of respective said connector plugs as required, said connector plugs when inserted in a said socket connecting a selected conductor of the first group to a selected conductor of the second group. The presence and relative positions of connector plugs in the sockets then provides at a glance an indication of the sequence of operation of the different control circuits, which may, for example, control different services in an hotel.

The invention will be more particularly described, by way of example only, with reference to the accompanying drawings, in which.

Figure 1:
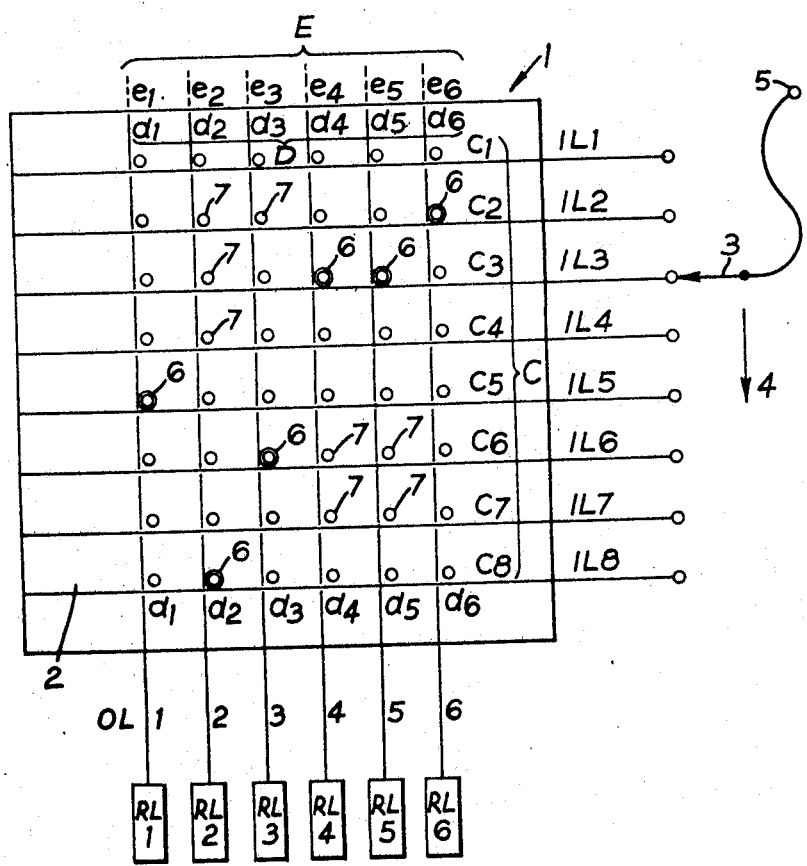
FIGURE 1 is a purely schematic diagram of a simple form of control apparatus according to the invention.

The relay control apparatus shown in FIGURE 1 is designed to complete, in a predetermined sequence, energising circuits to respective output lines OL1 . . . OL6. The output lines OL1 . . . OL6 each control different functions, for example different technical services in an hotel.

Control of the output lines OL1 . . . OL6 is effected through a matrix board 1 comprising an insulating laminar support member 2 which supports two groups of conductors C, D disposed in different parallel planes, for example, on opposite sides of the support member 2, or embedded in the member 2. The first group of conductors C comprises an array of parallel wires $c_1, c_2 \ldots c_7, c_8$ spaced apart at equal intervals in one said plane, and the second group D comprises an array of parallel wires $d_1, d_2 \ldots d_5, d_6$ extending perpendicular to the wires of the first group C and spaced apart at equal intervals in the other said plane. The two groups of conductors C, D are superimposed, so that each wire $c_1$–$c_8$ of the first group C crosses, but does not contact, each wire $d_1$–$d_6$ of the second group D.

Each wire $c_1$–$c_8$ of the first group C is connected through a respective input line IL1 . . . IL8 to sequential switching means comprising a movable contact 3 which is moved in the direction of arrow 4 to make electrical contact with each input line IL1 . . . IL8 in turn. The movable contact 3 is connected to one terminal 5 of a direct current source 5 so that an electrical circuit is completed through each of the wires $c_1$–$c_8$ of the first group C in sequence. The movable contact 3 most conveniently comprises a rotary arm which is moved in successive steps at equal time intervals to contact the input lines IL1 . . . IL8 sequentially.

The wires $d_1$–$d_6$ of the second group D are connected to the respective ouput lines OL1 . . . OL6. Any selected wire $c_1$–$c_8$ may be connected to any selected wire $d_1$–$d_6$ by means of appropriate connectors. Such connectors may comprise switches connecting respective wires $c_1$–$c_8$ to respective wires $d_1$–$d_6$ or, as in the illustrated embodiment, may comprise removable connector plugs 6 which are inserted in selected sockets 7 provided in the support member 2 adjacent each crossing point of the wires $c_1$–$c_8$ and $d_1$–$d_6$. Each connector plug 6 when so inserted selected wires of the first and second groups C, D. Thus in FIGURE 1 connector plugs 6 are shown in position to connect wires $c_2$ and $d_6$; $c_3$, $d_4$ and $d_5$; $c_5$ and $d_1$; $c_6$ and $d_3$; $c_8$ and $d_2$.

In operation, the terminal 5 is connected to each of the wires $c_1$–$c_8$ of the first group C in turn for equal successive time intervals $t$ through the movable contact 3, and as a result electrical circuits to the output lines OL1 ... OL6 are completed in a sequence dependent on the positions of the connector plugs 6. Thus with the plugs 6 positioned as shown, output line OL6 is the first to be energised, followed after an interval $t$ by OL4 and OL5 simultaneously, followed, after an interval of $2t$, by output line OL1, then by output line OL3 after an interval of $t$ and finally by output line OL2 after a further interval of $2t$. If desired any one or more of the output lines OL1–OL6 may be omitted from the sequence by failing to insert a connector plug 6 to contact the respective wire $d_1$–$d_6$ to which the respective output line is connected.

The arrangement of the connector plugs 6 on the matrix board 1 can be changed at will, and quite easily. Moreover, the board 1 itself presents a visual display to the user of the apparatus of the programmed sequence of energisation of the output lines OL1–OL6.

For performing required switching functions each of the output lines OL1 ... OL6 includes a respective relay RL1 ... RL6. The relays RL1 ... RL6 are in this embodiment provided with respective hold-in or "latching" means which ensure that each relay, once energised, remains energised even after the original energising current has ceased. Alternatively, if the relays RL1 ... RL6 do not have such hold-in means, the arrangement would be such that any one relay RL1 ... RL6 is energised only as long as current was present on the respective output line OL1 ... OL6.

Although the basic arrangement of FIGURE 1 may be suitable for certain applications, it is desirable additionally to arrange for automatic de-energisation of the relays RL1 ... RL6, also in a predetermined sequence. This can be done by modifying the matrix board 1 to provide a third group of conductors E comprising a further array of parallel wires $e_1$–$e_6$, one for each relay RL1 ... RL6, disposed in a single plane parallel to and spaced from the planes of the first and second groups of conductors C, D. The wires $e_1$, $e_6$ of the third group E are conveniently arranged parallel to and aligned with the wires $d_1$–$d_6$ of the second group D so that points at which the wires $c_1$–$c_8$ and $d_1$–$d_6$ cross are aligned with the points at which the wires $c_1$–$c_8$ and $e_1$–$e_6$ cross. Thus, referring to the simplified plan view of the matrix board 1 in FIGURE 1, the wires $d_1$–$d_6$ of the second group D are disposed behind the wires $c_1$–$c_8$ of the first group C and the wires $e_1$–$e_6$ of the third group E would be disposed behind and aligned with the wires $d_1$–$d_6$, as shown in broken lines in FIGURE 1. Each of the wires $e_1$–$e_6$ of the third group E is connected in a de-energising circuit of the respective relay RL1–RL6, as described hereinafter with reference to FIGURE 3.

Figure 2:
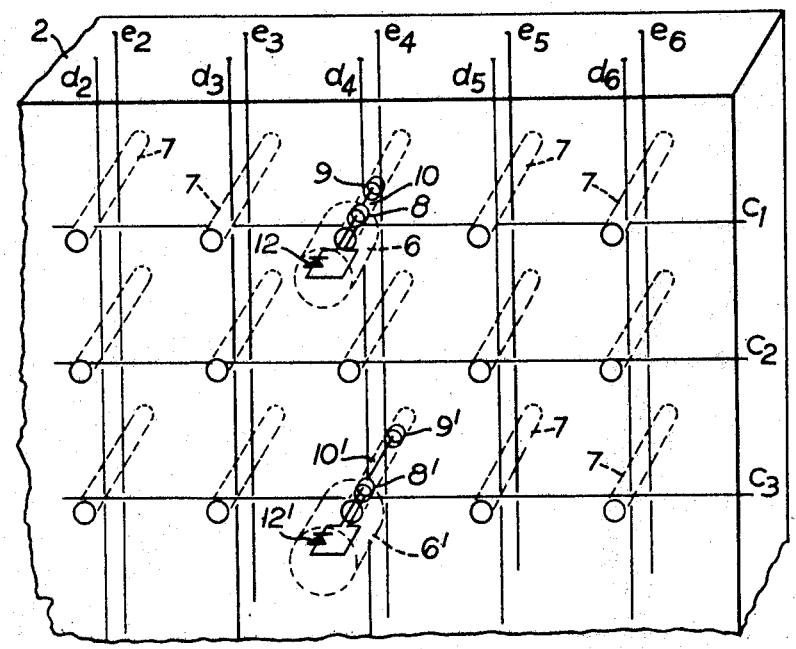
FIGURE 2 is a partly cut away view of part of a preferred form of conductor-carrying member or matrix board for use in the embodiment of FIGURE 3.

A matrix board 1 having three groups of conductors C, D, E is shown in FIGURE 2, which is a diagrammatic cut-away perspective view of part of the matrix board 1, as used in a preferred embodiment of the invention. The sockets 7 extend through the insulating support member 2 close to each respective crossing point of the wires $c_1$–$c_8$ and $d_1$–$d_6$. Each socket 7 is adapted to receive two kinds of connector plug 6, 6′, one each of which is shown diagrammatically: The plugs 6, as in the embodiment of FIGURE 1, effect a connection, when inserted in a socket 7, between a selected wire $c_1$–$c_8$ of the first group C and a selected wire $d_1$–$d_6$ of the second group D, and for this purpose each plug 6 has two conductive rings 8, 9 spaced apart on an insulating stem 10 and arranged to make contact with the selected wires of the first and second groups C, D respectively. The plugs 6′ effect a connection, when inserted in a socket 7, between the selected wire $c_1$–$c_8$ of the first group C and a selected wire $e_1$–$e_6$ of the third group E, and for this purpose each plug 6′ has an insulating stem 10′ on which two conductive rings 8′, 9′ are spaced so as to make contact with the selected wires of the first and third groups C, E respectively.

For each of the relays RL1 ... RL6 there are, in this example, eight different sockets 7 disposed in a single column, each of these sockets 7 being associated with a different one of the input lines $IL_1$ ... $IL_8$. If the movable contact 3 makes contact with the input lines $IL_1$ ... $IL_8$ successively, with equal time intervals $t$ between successive contacts, then each of the input lines $IL_1$ ... $IL_8$, and, therefore, each of the eight sockets of each said column, corresponds to a different time. For each of the relays RL1 ... RL6 which it is desired to operate a plug 6 is inserted in that one of the column of eight sockets 7 associated with the relay which corresponds to the required time of energisation of the said relay, and a connector plug 6′ is inserted in a further one of said sockets 7 which corresponds to the required time of de-energisation of the relay.

If it is desired to operate a given relay RL more than once during one complete cycle of movement of the movable contact 3 then a further pair of connector plugs 6, 6′ will be inserted in succession in appropriate sockets 7 of the respective column of sockets 7. To prevent return feed of current to any of the wires $c_1$–$c_8$ from the wires $d$, $e$ when more than one connector plug 6, 6′ is inserted in any one column, each of the plug 6, 6′ incorporates a solid state diode element 12, 12′ connected between the respective conductive rings 8, 9 and 8′, 9′ so as to ensure flow of current in one direction only, namely from the wires $c$ to the wires $d$, $e$ respectively.

Figure 3:
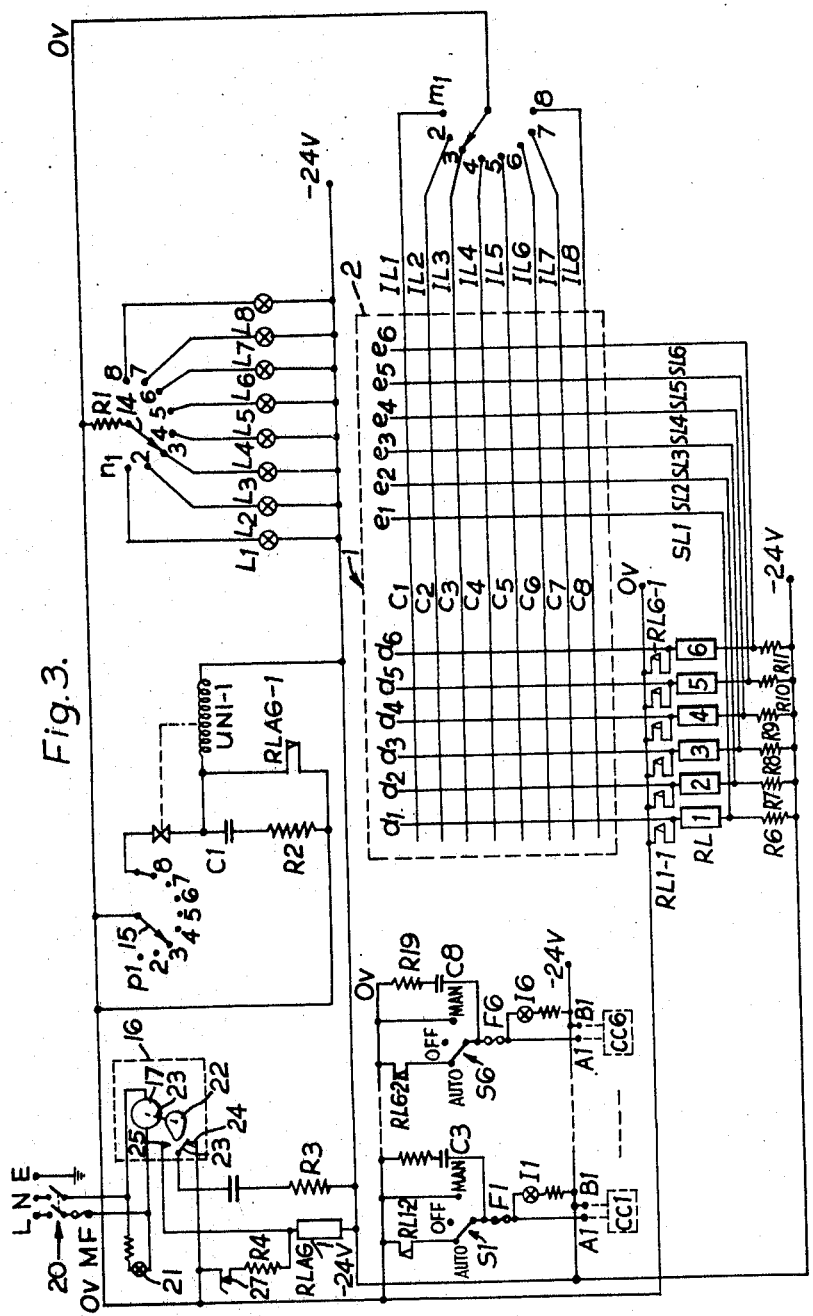
FIGURE 3 is a schematic circuit diagram of control apparatus according to a preferred embodiment of the invention.

A circuit diagram for control apparatus incorporating the matrix board 1 of FIGURE 2 is shown in FIGURE 3. The matrix board 1 is represented diagrammatically with the second group of wires $d$ shown separately from the third group of wires $e$. Where connector plugs 6, 6′ are inserted a diode connection is shown in broken lines between respective wires.

The input lines $IL_1$ ... $IL_8$ are connected to different respective contacts $m_1$–$m_8$ of a uniselector having a rotor arm 13 which corresponds to the movable contact 3 of FIGURE 1. The rotary arm 13 is coupled for rotation with two further rotor arms 14, 15 of the uniselector: the arm 14 cooperates with a set of contacts $n_1$–$n_8$ which are connected to respective indicator lamps L1–L8; the arm 15 cooperates with a set of contacts $p_1$–$p_8$ and constitutes the master rotor arm of the uniselector. The arm 15 is moved stepwise between successive contacts $p_1$–$p_8$ by a solenoid UNI–1 in a conventional manner. The rotor arm 15 moves the rotor arms 13, 14 in unison, the three arms being in step with each other, so that when the arm 15 is in contact with $p_1$, arms 13 and 14 are in contact with $m_1$ and $n_1$ respectively. The arm 13 is connected to the positive rail (0 volts) of a 24-volt D.C. supply, corresponding to the terminal 5 of FIGURE 1, and the arm 14 is connected to said positive rail through a resistor R1 (330 ohms).

One end of the uniselector solenoid UNI–1 is connected to the D.C. negative rail (−24 volts), the other end being connectible to the positive rail through relay contacts RLAG–1, which are normally open. A capacitor C1 (1 microfarad) and resistor R2 (220 ohms) in series are connected across the contacts RLAG–1 to provide a spark quench circuit for the uniselector. The relay contacts RLAG–1 are controlled by a relay RLAG/1 the energisation of which is in turn controlled by a cam switching unit 16, indicated within broken lines.

The cam switching unit 16 includes an A.C. motor 17 which may be connected across an A.C. mains supply 18 by means of a master switch 20. A mains indicator lamp 21 is connected across the supply leads of the motor 17, one of said supply leads including a fuse MF. The motor 17 drives a rotary cam 22, as indicated by a broken line 23 representing schematically a drive connection. A movable switch contact arm 23 co-operates with the cam 22. The switch arm 23 rests normally in contact with a fixed contact 24, but at predetermined time intervals $t$ (typically ½ hour) the cam 22 moves the switch arm 23 into contact with a further fixed contact 25 which is connected to the relay RLAG/1. The contact arm 23 completes a charging circuit for a capacitor C2 (50 microfarads) through a resistor R3 (180 ohms) when in contact with the fixed contact 24, and, when moved into contact with the further contact 25, it permits the charged capacitor C2 to discharge through the relay RLAG/1, momentarily energising the same.

In operation, therefore, the rotation of the cam motor 17 causes, through the relay contacts RLAG–1, successive momentary energisations of the uniselector solenoid UNI–1 at predetermined time intervals $t$. Each time the solenoid UNI–1 is de-energised after being so energised, the uniselector rotor arm 15, and with it the arms 13, 14 are indexed by one step to the next adjacent contacts, at which they remain until the relay RLAG/1 is next energised by the cam switching unit 16. The respective indicator lamp L1–L8 corresponding to the input line IL1 . . . IL8 to which the rotor arm 13 is connected will remain illuminated throughout the time that the uniselector remains in that setting.

Provision is made for manual indexing of the uniselector, independently of its automatic indexing by the cam switching unit 16, in the form of a normally open push-button switch 27 which, on closure, connects the relay RLAG/1 across the D.C. power supply through a resistor R4 (180 ohms) and energises the relay to initiate the indexing sequence described above.

The wires $d_1$–$d_6$ of the second group D are connected to one end of the coils of the respective relays RL1 . . . RL6, the other end of each respective relay coil being connected to the negative D.C. rail (–24 volts) through a respective resistor R6 . . . R12 (180 ohms). When the uniselector rotor arm 13 connects a given input line IL to the negative D.C. rail (0 volts) then any interconnections between the respective wire $c$ and any selected wires $d$ of the second group through a connector plug or plugs 6 will provide an energising circuit for the respective relays RL to which the wires $d$ are connected.

Once energised, each relay RL1 . . . RL6 is maintained energised by respective hold-in contacts RL1–1 . . . RL6–1 (normally open) which when closed connect the respective relay in series with its respective resistor R6 . . . R12 across the D.C. supply. Each relay also has switching function control contacts RL1–2 . . . RL6–2 associated therewith. These contacts, which are also normally open, and closed on energisation of the respective relay to complete a respective external control circuit CC1, CC6 is connected across a respective pair of output terminals A1, B1 . . . A6, B6, one of each of which B1 . . . B6 is connected to the D.C. negative (–24 volts) rail and the other A1 . . . A6 is connected through a fuse F1 . . . F6 (3 amps), a three-way toggle control switch S1 . . . S6 and the respective control contacts RL1–2 . . . RL6–2 to the D.C. positive rail. Each external control circuit CC1 . . . CC6 can be completed through the control contacts RL1–2 . . . RL6–2 only when the respective control switch S1 . . . S6 is in an AUTO setting. The control switch S1 . . . S6 each have two other settings, an OFF setting in which the respective output terminals A1 . . . A6 are isolated, and a MANUAL setting in which the respective terminals A1 . . . A6 are connected directly to the D.C. positive rail to complete the respective external control circuit CC1 . . . CC6.

A respective capacitor C3 . . . C8 (1 microfarad) and resistor R14 . . . R19 (220 ohms) in series are connected across each respective control switch S1 . . . S6 to quench sparking across the contacts thereof. In addition, a respective output indicator lamp I1 . . . I6 is connected across each pair of output terminals A1, B1 . . . A6, B6, that is, in parallel with each respective control circuit CC1 . . . CC6, to provide a visual indication of energisation of the respective circuit.

Each of the relays RL1 . . . RL6 is provided with de-energising means in the form of a respective shunt line SL1 . . . SL6 connecting each respective wire $e_1$ . . . $e_6$ of the third group E to the junction of each relay RL1 . . . RL6 and its respective series resistors R6 . . . R12. When a wire $c_1$ . . . $c_8$ is connected to the D.C. positive rail through an input line IL1 . . . IL8 and the uniselector rotor arm 13, any of the wires $e_1$ . . . $e_6$ which is connected to said wire $c_1$ . . . $c_8$ through a connector plug 6' is thereby also connected to the D.C. positive rail, effectively shunting the respective relay RL1 . . . RL6 through the respective shunt line SL1 . . . SL6 and said wires $e_1$ . . . $e_6$. As a result the respective relay RL1 . . . RL6 is de-energised and its associated contacts RL1–1, RL1–2 . . . RL6–1, RL6–2 open.

It will be appreciated that any number of input lines IL and associated wires $c$ may be provided, the number eight being used in the above examples for ease of illustration. In practice it is convenient where the control apparatus is to effect control of external control circuits CC over a 24-hour period, to provide 48 input lines IL1 . . . IL48 which are contacted by the rotor arm 13 for successive periods of ½ hour. Successive input lines IL1 . . . IL48 will then correspond to successive times, at half-hourly intervals, throughout the day.

Similarly, any number of wires $d$, $e$ may in principle be provided, depending on the number of external circuits CC which it is required to control.

Figure 4:
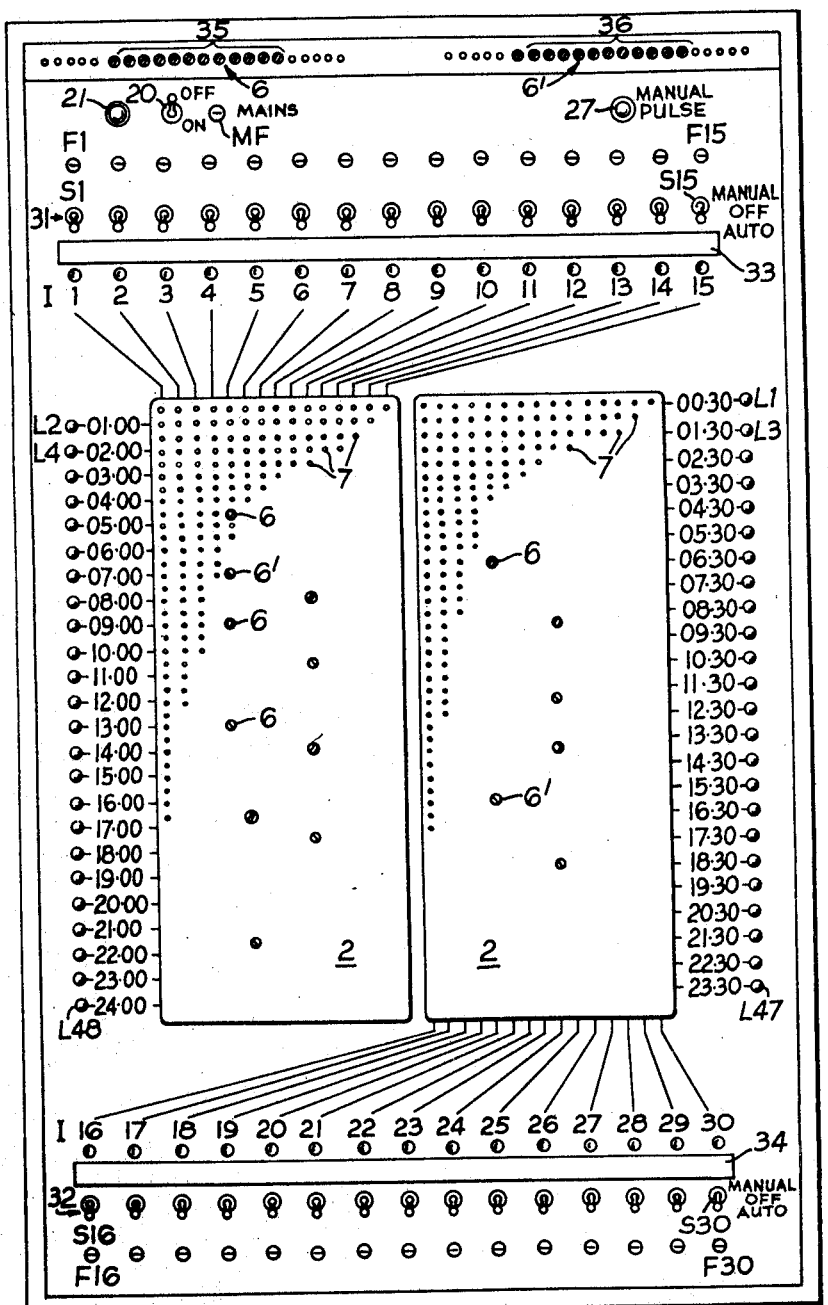
FIGURE 4 is a front elevation of a control apparatus according to the invention housed in a control console.

FIGURE 4 illustrates console presentation of control apparatus according to the invention having a capacity for controlling thirty external circuits over a twenty-four hour period at half-hourly intervals. The respective toggle control switches S1 . . . S30 are mounted in two banks 31, 32 each of fifteen switches at the top and bottom respectively of the console, each bank of switches having an adjacent indicator bar 33, 34 on which labels indicating the nature of the associated control circuit may be inserted. The respective fuses F1 . . . F30 and the respective output indicator lamps I1 . . . I30 (which are conveniently green in colour) are mounted adjacent the respective control switches S1 . . . S30.

The matrix board 1 is mounted centrally of the console, so that the sockets 7 therein form a rectangular array of 48 horizontal rows and 30 vertical columns. For ease of presentation the 15 columns associated with the upper bank 31 of control switches S is displayed separately from the 15 columns associated with the lower bank 32. The 48 horizontal rows are labelled, as shown, in half-hourly intervals, starting at 00.30 and ending at 24.00. The indicator lamps L1 . . . L48 associated with each horizontal row, which are conveniently amber in colour, are displayed adjacent each row. By suitably setting the uniselector and starting the cam switching unit 16 (by closing the master switch 20) at an appropriate time (on the hour or the half-hour) the labelling of the horizontal rows can be made to coincide with real time: the lamps L1 . . . L48 then indicate real time in half-hour intervals. The lamps $L_2$ . . . $L_{48}$ corresponding left hand side of the board 1 and the lamps $L_1$ . . . $L_{47}$ corresponding to half hours are presented at the right hand side of the board 1.

Connector plugs 6 and 6' respectively are inserted in the matrix board 1, as required, to mark the times of energisation and of de-energisation respectively of the respective control circuits CC1 ... CC30, as described above with reference to FIGURE 2. It is convenient to arrange that the connector plugs 6 should be visually distinguishable from the connector plugs 6': thus the plugs 6 are green and the plugs 6' red, and moreover, the plugs 6 can be of different size and shape from the plugs 6'. A user of the apparatus can then see, at a glance: (a) which of the control circuits CC is currently energised (lamps I1 ... I30); (b) which circuits are programmed for control (indicated by the columns of sockets 7 in which plugs 6 are inserted); (c) what the scheduled times of energisation and of de-energisation of these circuits are (indicated by the relative positions of plugs 6 and 6' in any one column), and (d) at which stage in the sequence the apparatus is operating (indicated by an illuminated lamp L1 ... L48).

The manual indexing push-button 27 is also included on the front of the console, together with the master switch 20, the mains indicator lamp 21 and the mains fuse MF. Sockets 35, 36 are provided along the upper edge of the console for the reception of connector plugs 6, 6' which are not in use.

The control apparatus according to the invention can be programmed relatively easily by a technically unskilled operator, and moreover, its programme can be changed readily and quickly as required.

It will be apparent that many modifications may be made to the apparatus described herein without departing from the scope of the invention: for example, the matrix wires c, d, e may be replaced by conductors deposited on respective substrates by a printed circuit technique.

We claim:

1. Switching control apparatus comprising:
    a matrix of first, second and third groups of conductors;
    first connector means effective to interconnect selectively as required any selected conductor of the first group and any selected conductor of the second group;
    further connector means effective to interconnect as required any selected conductor of the first group and any selected conductor of the third group;
    respective input lines connected to respective conductors of the first group;
    respective relays connected to respective conductors of the second group;
    a source of energizing current connectable to a selected said input line to energize such of said relays as is connected thereto through a respective said first connector means; and,
    respective delay de-energizing means connected to respective conductors of the third group and to a respective said relays, whereby current applied from said source to a selected said input line operates such of the relay de-energizing means as is connected thereto through a respective said further connector means.

2. Apparatus as claimed in claim 1 and including sequential switching means which are operative to make an electrical connection to each said input line in a predetermined sequence.

3. Apparatus as claimed in claim 1 wherein a respective indicator device is connected in each of the input lines and is operative to indicate when current is supplied to each respective input line.

4. Apparatus as claimed in claim 1 wherein a respective indicator device is connected to each of the output lines and is operative to indicate when each output line device is energised.

5. Apparatus as claimed in claim 1 wherein each of said connector means and further connector means includes a diode element for preventing the return feed of current to conductors of the first group from conductors of the second and third groups.

6. Apparatus as claimed in claim 1, wherein each conductor of the first group crosses but does not contact each conductor of the second and third groups.

7. Apparatus as claimed in claim 6 wherein the first, second and third groups of conductors comprise respective arrays of parallel conductors disposed in parallel spaced apart planes.

8. Apparatus as claimed in claim 7 wherein the respective arrays of conductors are carried by an insulating member, the conductors of the second and third groups being parallel to each other and perpendicular to the conductors of the first group.

9. Apparatus as claimed in claim 8 in which the connector means and the further connector means comprise first and second respective connector plugs, and the insulating member has respective sockets therein, corresponding to each crossing point of the conductors for the removable insertion as required of a first or a second connector plug selectively, each first connector plug when inserted in a said socket connecting a selected conductor of the first group to a selected conductor of the second group, and each second connector plug when inserted in a said socket connecting a selected conductor of the first group to a selected conductor of the third group.

10. Apparatus as claimed in claim 9 wherein the crossing points of corresponding conductors of the second and third groups are aligned with the respective crossing points of the conductors of the first and second group, so that common sockets serve for the insertion of both first and second connector plugs as required.

11. Apparatus as claimed in claim 9 wherein the first connector plugs are visually distinguishable from the second connector plugs.

12. Apparatus as claimed in claim 1, including respective relay hold-in means for maintaining each relay energized when energized by current from said source until de-energized by the respective de-energizing means connected thereto.

13. Apparatus as claimed in claim 12 wherein each relay hold-in means comprise a pair of normally open hold-in contacts operatively connected to the respective relay device, and a direct current supply which is connected across the relay device to maintain energisation thereof when the hold-in contacts are closed, on energisation of the relay device.

14. Apparatus as claimed in claim 13 wherein each relay de-energising means comprises a resistor connected in series with the respective relay device across said direct current supply, each respective conductor of the third group being connected to the junction of the respective relay device and the respective resistor so that when energising current is present on the said conductor the potential difference across the relay device falls by an amount to effect de-energisation of the relay device and opening of the relay hold-in contacts.

References Cited

UNITED STATES PATENTS

| 2,201,162 | 5/1940 | Elliott | 317—139 X |
| 3,065,439 | 11/1962 | Krause | 339—18 |
| 3,225,263 | 12/1965 | Steenberg | 317—112 |

LEE T. HIX, Primary Examiner

W. J. SMITH, Assistant Examiner

U.S. Cl. X.R.

317—154; 339—18; 340—166